3,213,079
METALLIZED PYRAZOLONE AZO DYES
Piero Maderni, Binningen, Reinhard Neier, Basel, and Walter Wehrli, Riehen, Switzerland, assignors to Sandoz Ltd. (a/k/a Sandoz A.G.), Basel, Switzerland
No Drawing. Filed Jan. 18, 1963, Ser. No. 252,299
Claims priority, application Switzerland, Jan. 9, 1962, 634/62; Feb. 9, 1962, 1,596/62
5 Claims. (Cl. 260—147)

This invention relates to valuable azo dyes which in the metal free form have the formula

in which A represents the radical of a diazotized amine of the formula

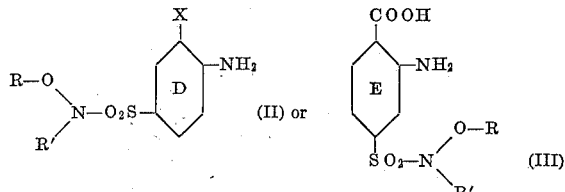

wherein:

X represents a metallizable group or a substituent which can be converted into a metallizable group,
R a substituted or unsubstituted hydrocarbon radical,
R' hydrogen or a substituted or unsubstituted hydrocarbon radical,
B the radical of a pyrazolone coupling in the 4-position, which may contain at least once the group of the formula

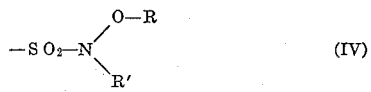

and Z a metallizable group or a substituent which can be converted into a metallizable group.

These new dyes (I) can conveniently be prepared by coupling a diazotized aromatic amine of the Formula II or III with a pyrazolone which couples in the 4-position and which may contain at least once the group of the formula

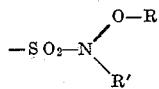

The nuclei D and/or E may contain, in addition to a group of Formula IV, further substituents, e.g. chlorine, the alkyl or nitro group, etc., or any other substituents, the latter being preferably non-water-solubilizing although water-solubilizing substituents also can lead to good dyes. The pyrazolone coupling in the 4-position may also contain other substituents in addition to a group of Formula IV.

The coupling reaction can be carried out by any of the known methods. The resulting compounds can be treated with metal-yielding agents, such as cobalt- or preferably chromium-yielding agents, either in substance or on the fiber. The dyes are also suitable for application as after-chrome dyes.

Suitable chromium compounds are e.g. chromic fluoride, chromic sulfate, chromic formate, chromic acetate, chromic potassium sulfate, and chromic ammonium sulfate. The chromates, e.g. sodium and potassium chromate or bichromate, are also eminently suitable.

The metallization is carried out by the known method, the solution of the chosen metal salt being allowed to act upon the dye at an elevated temperature, if desired in the presence of an organic solvent, e.g. formamides.

Subsequently the organic metallizing solution may be run into water and the metal complex compound formed is then precipitated from aqueous medium by the addition of salt, filtered off, washed if necessary, and dried.

The new dyes are suitable for the dyeing, padding and printing of fibers of animal origin, e.g. wool and silk; polyamide fibers, e.g. nylon; paper; and leather. They are also suitable for dyeing and printing articles of polymers containing more than 80% acrylonitrile, e.g. polyacrylonitrile such as "Acrilan" (registered trademark), and copolymers of 95% acrylonitrile and 5% vinyl acetate etc. On these materials they give dyeings of good depth and good fastness to light and to wet treatments such as washing perspiration, milling, chlorine, stoving, alkali, rubbing, water, and sea water.

The dyes also dye very well blended fabrics containing polyacrylonitrile fiber as one of the components. A number of them are suitable for dyeing polyacrylonitrile in the mass in light- and wet-fast shades. Those which possess good solubility in organic solvents are suitable for the coloration of oils, paints and lacquers, plastics, and artificial fibers in solution in organic solvents.

In the following examples the parts and percentages are by weight and the temperatures in degrees centigrade.

EXAMPLE 1

24.6 parts of 1-amino-2-carboxybenzene-4-sulfonic acid methoxyamide are dissolved in 180 parts of water with sodium hydroxide at a pH value of 9.7–9.8. 6.9 parts of sodium nitrite are added and the solution run slowly with stirring into a mixture of 30 parts of concentrated hydrochloric acid, 100 parts of water and 160 parts of ice. The diazo solution thus formed is allowed to flow into a vigorously stirred mixture of 100 parts of water, 21 parts of 30% sodium hydroxide solution, 20.9 parts of 1-(3'-chlorophenyl)-3-methyl-5-pyrazolone and 100 parts of ice. Stirring is continued at a temperature of 5–6° and a pH value of 7.5 to 8 until completion of the coupling reaction. The mass is then heated to 60–63° and 19.5 parts of concentrated hydrochloric acid are added. The precipitated dye is filtered and dried to give a brownish yellow powder which dissolves in dilute sodium hydroxide solution with a yellow coloration.

9.3 parts of the monoazo dye thus obtained are heated in 60 parts of formamide at 100–105°. 3 parts of chromium formate, equivalent to 0.55 part of chromium, are added and the mass heated at 100–105° until completion of the reaction. The mass is run into 300–350 parts of 20% potassium chloride solution, and the precipitated dye filtered and dried at 65–70° with vacuum. The chromium complex thus obtained dyes wool, silk, leather, polyamide and polyacrylonitrile fibers from a weakly acid bath in yellow shades that are fast to washing, perspiration, milling, chlorine, stoving, alkali, rubbing, water, sea water and light.

EXAMPLE 2

The 1 - amino - 2 - carboxybenzene - 4 - sulfonic acid methoxyamide and 1 - (3' - chlorophenyl) - 3 - methyl-5-pyrazolone used in Example 1 are replaced respectively by equivalent amounts of 1-amino-2-carboxybenzene-4-sulfonic acid-N-methoxy-N-propylamide and 1-(3'-sulfonamido-phenyl)-3-methyl-5-pyrazolone, to give a chromium complex with similar properties.

The following diazotized amines can be employed with equally good success using the procedure described in Example 1:

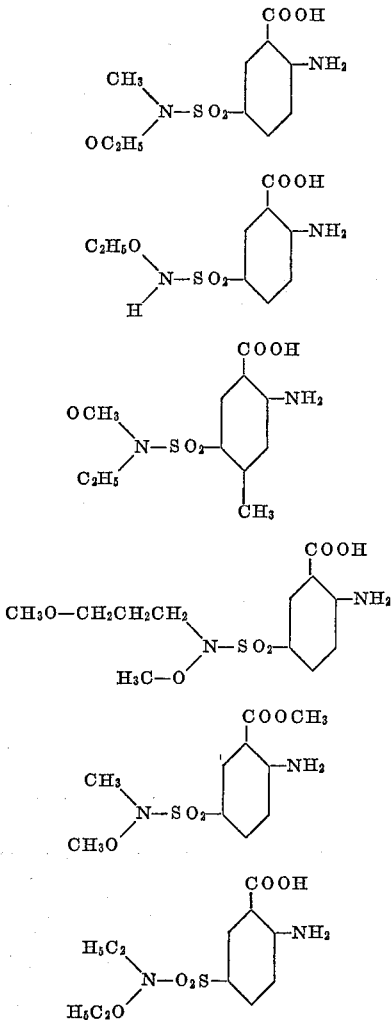

In general, particularly good dyes are obtained when the radical R of the substituent

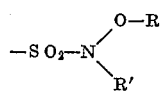

is an alkyl radical substituted if desired, by non-water-solubilizing atoms or a group of atoms, and R' is a radical of the same type or hydrogen.

EXAMPLE 3

21.8 parts of 1-amino-2-hydroxybenzene-4-sulfonic acid methoxyamide are diazotized in the normal way with 26 parts of concentrated hydrochloric acid and 6.9 parts of sodium nitrite in water at 3–5°. The diazo solution is dropped into an energetically stirred soda-alkaline suspension of 27.3 parts of 1-(4'-methoxysulfamidophenyl)-3-methyl-5-pyrazolone at 5–8°, a constant pH value of 7.9–8.3 being maintained by the addition of concentrated sodium carbonate solution. On completion of coupling the precipitated dye is filtered and dried at 70–73°.

10 parts of this dye are treated with 5 parts of chromium ammonia alum in the presence of formamide as described in Example 1. A chromium complex is obtained which dyes wool, silk, leather, polyamide and polyacrylonitrile fibers from a neutral to weakly acid bath in level scarlet shades which are fast to washing, perspiration, milling, water, alkali, chlorine, stoving, rubbing, sea water and light.

In the table hereunder are set forth further starting compounds for the production of homogeneous azo dyes and their metal-containing compounds. They can be produced by the procedures of Examples 1 to 3. In column (I) the diazo component is listed, in column (II) the coupling component and in column (III) the shade of the dyeing of the chromium complex on wool.

*Table*

| Example No. | Diazo Component (I) | Coupling Component (II) | Shade of dyeing on wool (III) |
|---|---|---|---|
| 4 | 1-amino-2-hydroxy-benzene-4-sulfonic acid-methoxyamide. | 1-(3'-methylsulfamido-phenyl)-3-methyl-5-pyrazolone. | Scarlet. |
| 5 | ____do____ | 1-(3'-methoxysulfamido-phenyl)-3-methyl-5-pyrazolone. | Do. |
| 6 | ____do____ | 1-(3'-isopropylsulfami-dophenyl)-3-methyl-5-pyrazolone. | Do. |
| 7 | 1-amino-2-hydroxy-5-methylbenzene-4-sulfonic acid-methoxyamide. | 1-(1'-naphthyl)-3-methyl-5-pyrazolone-4'-sulfonic acid-eth-oxyamide. | Red. |
| 8 | 1-amino-2-hydroxy-5-chlorobenzene-4-sulfonic acid-ethoxyamide. | 1-(3'-sulfamido-phenyl)-3-methyl-5-pyrazolone. | Do. |

EXAMPLE 9

26 parts of 1-amino-2-carboxybenzene-5-sulfonic acid ethoxyamide are indirectly diazotized as described in Example 1 and the diazo component coupled with 17.6 parts of 1-phenyl-3-methyl-5-pyrazolone.

8.9 parts of the resulting dye and 2.05 parts of chromium formate are heated in 95 parts of an ethylpolyglycolether for 2–3 hours at 95–105°. On formation of the chromium complex the solution is run into 300 parts of a 7.5% sodium chloride solution. The precipitated chromium complex compound is filtered off, washed with 5% sodium chloride solution and dried at 80°. A dark yellow powder is obtained which dyes wool, silk, leather, polyamide and polyacrylonitrile fibers from a neutral to weakly acid bath in level yellow shades that are fast to washing, milling, perspiration, water, rubbing, carbonizing, alkali, stoving, chlorine and light. Dyes with similar properties are obtained when the 1-phenyl-3-methyl-5-pyrazolone is replaced by an equivalent amount of 1-(5',6',7',8'-tetrahydro-1'-naphthyl-3-methyl-5-pyrazolone-4'-sulfonic acid amide or 1-naphthyl-(2')-3-methyl-5-pyrazolone or 1-(4'-chloro-3-sulfonamidophenyl)-3-methyl-5-pyrazolone.

When the 26 parts of 1-amino-2-carboxybenzene-5-sulfonic acid ethoxyamide are replaced by 30.4 parts of 1-amino-2-carboxy-4-nitrobenzene-5-sulfonic acid methoxyamide, a dye with similar properties giving brown-red dyeings is obtained.

EXAMPLE 10

10.9 parts of the unmetallized monoazo dye obtained according to the procedure of Example 1 from diazotized 1-amino-2-carboxybenzene-4-sulfonic acid methoxy amide and 1-(3'-chlorophenyl)-3-methyl-5-pyrazolone and 10.7 parts of the chromium complex obtained by coupling diazotized 1-amino-2-hydroxy-5-chlorobenzene-3-sulfonic acid with 2-hydroxynaphthalene and subsequent metallizing, which contains one atom of chromium to one molecule of dye, are dissolved in 500 parts of water with 10 parts of sodium hydroxide. The solution is heated at 100° until the metal-free dye is no longer indicated. The mixed metal complex thus formed is precipitated with common salt, filtered off, dried and ground. It is a dark-colored powder which dyes wool, silk, leather, and polyamide fibers from a neutral to weakly acid bath in bordeaux

EXAMPLE 11

21.8 parts of 1-amino-2-hydroxybenzene-4-sulfonic acid methoxyamide are diazotized in the normal way with sodium nitrite in hydrochloric acid solution. The diazonium salt is then coupled with 21 parts of 1-(p-chlorophenyl)-3-methyl-5-pyrazolone in the known manner, preferably at pH 10–10.5. The resulting dye is dried and treated in formamide at 70° with an amount of crystallized cobalt acetate sufficient for half an atom of cobalt to act upon one molecule of the dye. The product, a brownish yellow metal complex dye, is applied to wool, polyamide and polyacrylonitrile fibers from a weakly acid bath and gives level orange dyeings which are fast to light, washing, perspiration, milling, water, rubbing, alkali, chlorine and stoving.

When in place of the 21 parts of 1-(p-chlorophenyl)-3-methyl-5-pyrazolone an equivalent amount of 1-phenyl-3-methyl-5-pyrazolone is used and the procedure of Example 11 is followed in all other respects, the product is an orange cobalt complex dye which gives light- and wet-fast dyeings on wool and polyamide fibers.

The dyes of this example are also suitable for the dyeing and printing of articles made from polymers composed of more than 80% acrylonitrile, e.g. polyacrylonitrile, and copolymers of 95% acrylonitrile and 5% vinyl acetate. The term polyacrylonitrile fibers includes the polymerization products of acrylonitrile, e.g. the fiber "Courtelle" (registered trademark).

The dyes of Example 11 can be used further for the coloration of oils, paints and lacquers and plastics, and the dyeing of paper and leather.

EXAMPLE 12

21.8 parts of 1-amino-2-hydroxybenzene-4-sulfonic acid methoxyamide are diazotized with 6.9 parts of sodium nitrite in 20 parts of 30% hydrochloric acid and 100 parts of water, and then dissolved with 19.9 parts of 1-(3'-cyanophenyl)-3-methyl-5-pyrazolone in 100 parts of water with 10 parts of sodium hydroxide with ice cooling. As soon as formation of the azo dye is complete, it is precipitated with sodium chloride, filtered off, dried and ground. It is obtained as a brown powder which dissolves in water to give red solutions and dyes wool by the afterchrome process in red shades that are fast to light, washing, milling, perspiration, water-carbonizing, rubbing, stoving, chlorine, alkali and cross-dyeing.

21.7 parts of the dye and 13 parts of chromic potassium sulfate are heated at 100° in a solution of 80 parts of formamide and 80 parts of urea until no further metal-free dye is indicated in the melt. The chromium complex formed is precipitated by dilution with water and isolated, dissolved again in dilute aqueous sodium hydroxide solution and precipated by the addition of sodium chloride, filtered off, dried and ground. It is then a brown powder which dissolves in water with a red coloration and dyes wool, silk, leather and polyamide fibers from a weakly acid bath in red shades of good fastness to light, milling, washing, perspiration, water, carbonizing, rubbing, stoving, alkali and chlorine.

Dyes with similar properties are obtained when the 19.9 parts of 1-(3'-cyanophenyl)-3-methyl-5-pyrazolone are replaced by an equivalent amount of 1-(3',6'-dichlorophenyl-3-methyl-5-pyrazolone or 1-(5',6',7',8'-tetrahydro-1'-naphthyl)-3-methyl-5-pyrazolone-4'-sulfonic acid methylamine or 1-(naphthyl-2')-3-methyl-5-pyrazolone or 1-(5',6',7',8'-tetrahydro-1'-naphthyl)-3-methyl-5-pyrazolone-4'-sulfonic acid methoxyamide.

The dyes of Example 12 can also be used for the coloration of oils, paints and lacquers and plastics, and for the dyeing of paper and leather.

EXAMPLE 13

10.9 parts of the unmetallized monoazo dye from diazotized 1-amino-2-hydroxybenzene-4-sulfonic acid methoxyamide and 1-(3'-chlorophenyl)-3-methyl-5-pyrazolone and 10.7 parts of the chromium complex obtained by coupling diazotized 1-amino-2-hydroxy-5-chlorobenzene-3-sulfonic acid with 2-hydroxy-naphthalene and subsequent metallization, which contains one atom of chromium to one molecule of dye, are dissolved in 500 parts of water with 10 parts of sodium hydroxide and heated at 100° until the metal-free dye is no longer indicated. The mixed metal complex thus formed is precipitated with common salt, filtered off, dried and ground. It is a dark powder that dyes wool, silk, leather and polyamide fibers from a neutral to weakly acid bath in level bordeaux shades that are fast to light, water, washing, perspiration, carbonizing, rubbing, alkali, stoving and chlorine.

EXAMPLE 14

10.9 parts of the unmetallized monoazo dye from diazotized 1-amino-2-hydroxybenzene-4-sulfonic acid-methoxyamide and 1-(3'-chlorophenyl)-3-methyl-5-pyrazolone and 6,6 parts of the monoazo dye obtained by coupling diazotized 1-amino-2-hydroxy-5-chlorobenzene-3-sulfonic acid with 2-hydroxy-naphthalene are heated with 11 parts of chromic potassium sulfate in 150 parts of formamide at 100° until metallization is complete. The heterogeneous mixed chromium complex compound thus formed is precipitated by diluting the mass with 300 parts of water and by the addition of common salt, filtered off, dried and ground. It is a dark powder that dyes wool, silk, leather and polyamide fibers from a neutral to weakly acid bath in level bordeaux shades that are fast to light, water, washing, perspiration, carbonizing, rubbing, alkali, stoving and chlorine.

DYEING EXAMPLE A 10 parts of wetted-out wool are entered into a dyebath at 40° consisting of 1000 parts of water and 0.2 part of the dye obtained according to the procedure of Example 1. The dyebath is heated to 100° in 20 minutes and held at this temperature for 1 hour. During this time 2 parts of 10% acetic acid are added dropwise and the water lost by evaporation is replaced from time to time. On completion of dyeing the yellow-dyed wool is removed, rinsed and dried.

Nylon and other polyamide fibers are dyed in exactly the same way as wool. Silk also is dyed like wool except that the dyebath is maintained at a temperature below 90° throughout the dyeing process. Leather and paper are dyed by the methods commonly used in practice.

DYEING EXAMPLE B 100 parts of a fabric of a polyacrylonitrile fiber, e.g. "Courtelle" (registered trademark) are entered into a dyebath at 25° consisting of 4000 parts of water and 2 parts of the dye obtained according to the procedure of Example 12. 20 parts of 10% sulfuric acid are added and the bath brought to the boil in 30 minutes. After 30 minutes at the boil 20 parts of 10% sulfuric acid are added dropwise. Boiling is continued for a further 30 minutes and the evaporated water replaced as necessary. On completion of dyeing the red-dyed "Courtelle" fabric is removed from the bath, rinsed and dried.

Formula of representative dyes of the foregoing examples are as follows:

EXAMPLE 1

The 1:2 chromium complex compound of the azo dye of the azo dye of the formula

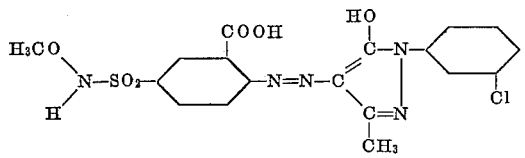

EXAMPLE 3

The 1:2 chromium complex compound of the azo dye of the formula

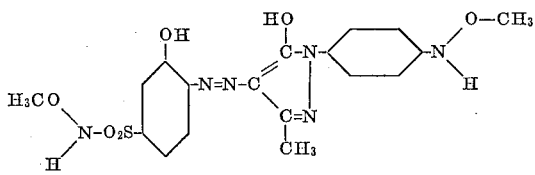

EXAMPLE 10

The 1:2 homogeneous chromium mixed complex compound obtained from the mixture of one molecule of each of the azo dyes of the formula

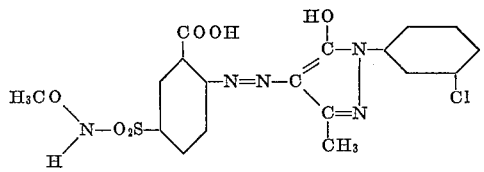

and

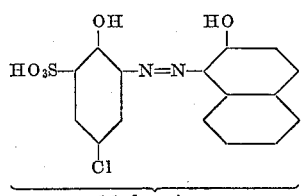

1:1 chromium complex compound

EXAMPLE 11

The 1:2 cobalt complex compound of the azo dye of the formula

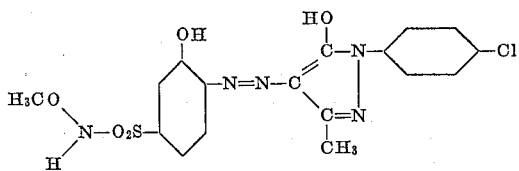

EXAMPLE 12

The 1:2 chromium complex compound of the azo dye of the formula

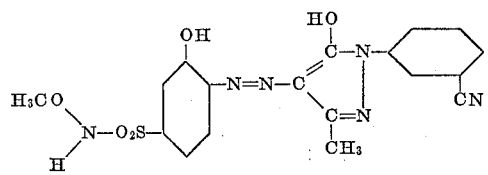

Having thus disclosed the invention what we claim is:
1. A member selected from the group consisting of 1:2 chromium and 1:2 cobalt complex compound of dyes of the formula

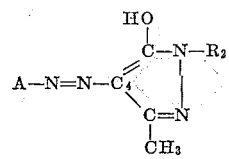

wherein:
A is a member selected from the group consisting of radicals of diazotized amines of the formulae

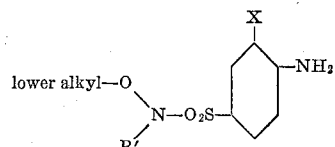

and

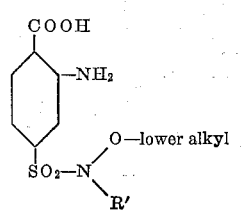

wherein:
X is a member selected from the group consisting of hydroxy and carboxy,
R' is a member selected from the groups consisting of hydrogen, lower alkyl and propylene-methoxy, and
$R_2$ is a radical selected from the group consisting of phenyl, chlorophenyl, sulfonamidophenyl, lower alkoxy-sulfamidophenyl, lower alkyl-sulfamido-phenyl, naphthyl, naphthyl-sulfonic acid lower alkoxy amide, 5',6',7',8'-tetrahydronaphthyl - sulfonic acid amide, chloro-sulfonamidophenyl, cyanophenyl and dichlorophenyl, 5',6',7',8'-tetrahydronaphthyl - sulfonic acid lower alkyamide and 5',6',7',8'-tetrahydronaphthyl- sulfonic acid lower alkoxy amide.

2. The 1:2 chromium complex compound of the azo dye of the formula

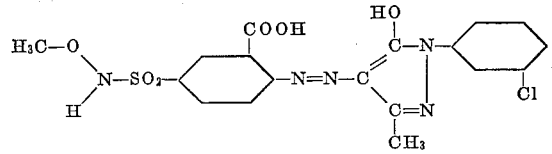

3. The 1:2 chromium complex compound of the azo dye of the formula

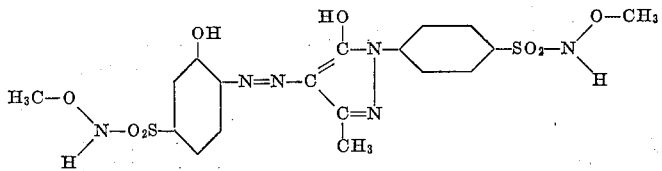

4. The 1:2 cobalt complex compound of the azo dye of the formula

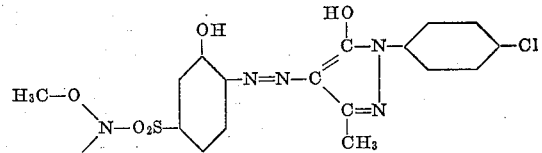

5. The 1:2 chromium complex compound of the azo dye of the formula

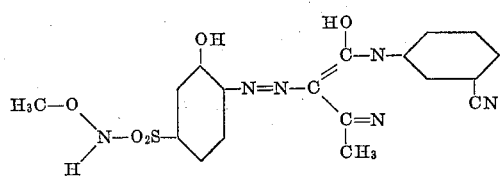

No references cited.

CHARLES B. PARKER, *Primary Examiner.*